US012804105B2

(12) United States Patent
Ocampo et al.

(10) Patent No.: US 12,804,105 B2
(45) Date of Patent: Nov. 17, 2026

(54) AI CAMERA SYSTEM TRAINED TO UNDERSTAND FRAMING AVATARS IN VIDEO CALLS

(71) Applicant: Meta Platforms Technologies, LLC, Menlo Park, CA (US)

(72) Inventors: Christopher John Ocampo, Dublin, CA (US); Stefano Zanetti, Vancouver (CA)

(73) Assignee: Meta Platforms Technologies, LLC, Menlo Park, CA (US)

( * ) Notice: Subject to any disclaimer, the term of this patent is extended or adjusted under 35 U.S.C. 154(b) by 132 days.

(21) Appl. No.: 18/913,961

(22) Filed: Oct. 11, 2024

(65) Prior Publication Data

US 2026/0106951 A1 Apr. 16, 2026

(51) Int. Cl.

| | |
|---|---|
| ***H04N 7/15*** | (2006.01) |
| ***G06F 3/01*** | (2006.01) |
| ***G06T 13/40*** | (2011.01) |
| ***G06T 17/00*** | (2006.01) |

(52) U.S. Cl.
CPC ............. *H04N 7/157* (2013.01); *G06F 3/011* (2013.01); *G06T 13/40* (2013.01); *G06T 17/00* (2013.01)

(58) Field of Classification Search
CPC ......... H04N 7/157; G06F 3/011; G06T 13/40; G06T 17/00
See application file for complete search history.

(56) References Cited

U.S. PATENT DOCUMENTS

| | | | | |
|---|---|---|---|---|
| 12,052,299 B2 * | 7/2024 | Cossar | ................ | H04L 65/1083 |
| 2010/0245532 A1 * | 9/2010 | Kurtz | ..................... | G06V 20/40 348/14.03 |
| 2016/0006987 A1 * | 1/2016 | Li | ........................ | G06V 40/174 348/14.03 |

* cited by examiner

*Primary Examiner* — Olisa Anwah
(74) *Attorney, Agent, or Firm* — EVERSHEDS SUTHERLAND (US) LLP

(57) ABSTRACT

A virtual device of the subject technology comprises a processor to execute machine-learning (ML) instructions, memory to store a first set of data and a tracking module to track body positioning of a user. The ML instructions are used to train an artificial-intelligence (AI) model to frame an avatar by leveraging the tracked body positioning of the user.

20 Claims, 10 Drawing Sheets

600

800

900

AI CAMERA SYSTEM TRAINED TO UNDERSTAND FRAMING AVATARS IN VIDEO CALLS

TECHNICAL FIELD

The present disclosure generally relates to artificial intelligence (AI) cameras, and more particularly to an AI camera system trained to understand framing avatars in video calls.

BACKGROUND

The emergence of AI has led to the development of AI-based technologies, including smart cameras. Smart cameras have revolutionized the field of photography and videography by integrating AI technology with traditional camera systems. At its core, a smart camera operates like having a mini photographer inside a device, one who has learned from millions of images and knows exactly how to make photos shine. This is not just about applying filters; it is about intelligently analyzing photos to enhance the photo in the best way possible. A smart camera relies on special software to give users the ability to snap images that previously only high-end cameras were able to capture.

For example, some smart cameras use a high dynamic range (HDR) technology to snap a dozen or more pictures in rapid succession, then use AI software to align and combine them into a single image free of any blur from camera shake. In addition to enhancing photo quality, smart cameras also offer features such as background removal and blurring, light correction, and even the ability to generate custom backgrounds. These features not only improve the aesthetics of the photos but also provide users with a greater degree of control and customization over their images. However, the existing smart cameras are not configured to understand the body positioning and intent of a user. As such, there is a need for a virtual camera that can remedy the deficiencies of the existing smart cameras that keep the user in frame.

SUMMARY

According to some embodiments, a virtual device of the subject technology includes a processor to execute machine-learning (ML) instructions, memory to store a first set of data and a tracking module to track body positioning of a user. The ML instructions are used to train an artificial-intelligence (AI) model to frame an avatar by leveraging the tracked body positioning of the user.

According to some embodiments, a virtual camera of the subject technology includes a processor to execute ML instructions and a tracking module to track body positioning of a user. The ML instructions are used to train an AI model to frame an avatar based on the tracked body positioning of the user. The avatar includes a selected one of a plurality of avatars. The plurality of avatars are retrieved from a local memory or obtained from a cloud storage.

According to some embodiments, a method of the subject technology includes tracking, by a tracking module, body positioning of a user. The method also includes selecting, by a processor, an avatar from a plurality of avatars stored in a local memory or a cloud storage. The method further includes training an AI model, by executing via a processor, ML instructions to frame the selected avatar based on the tracked positioning and an intent of the user.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

Figure 1:
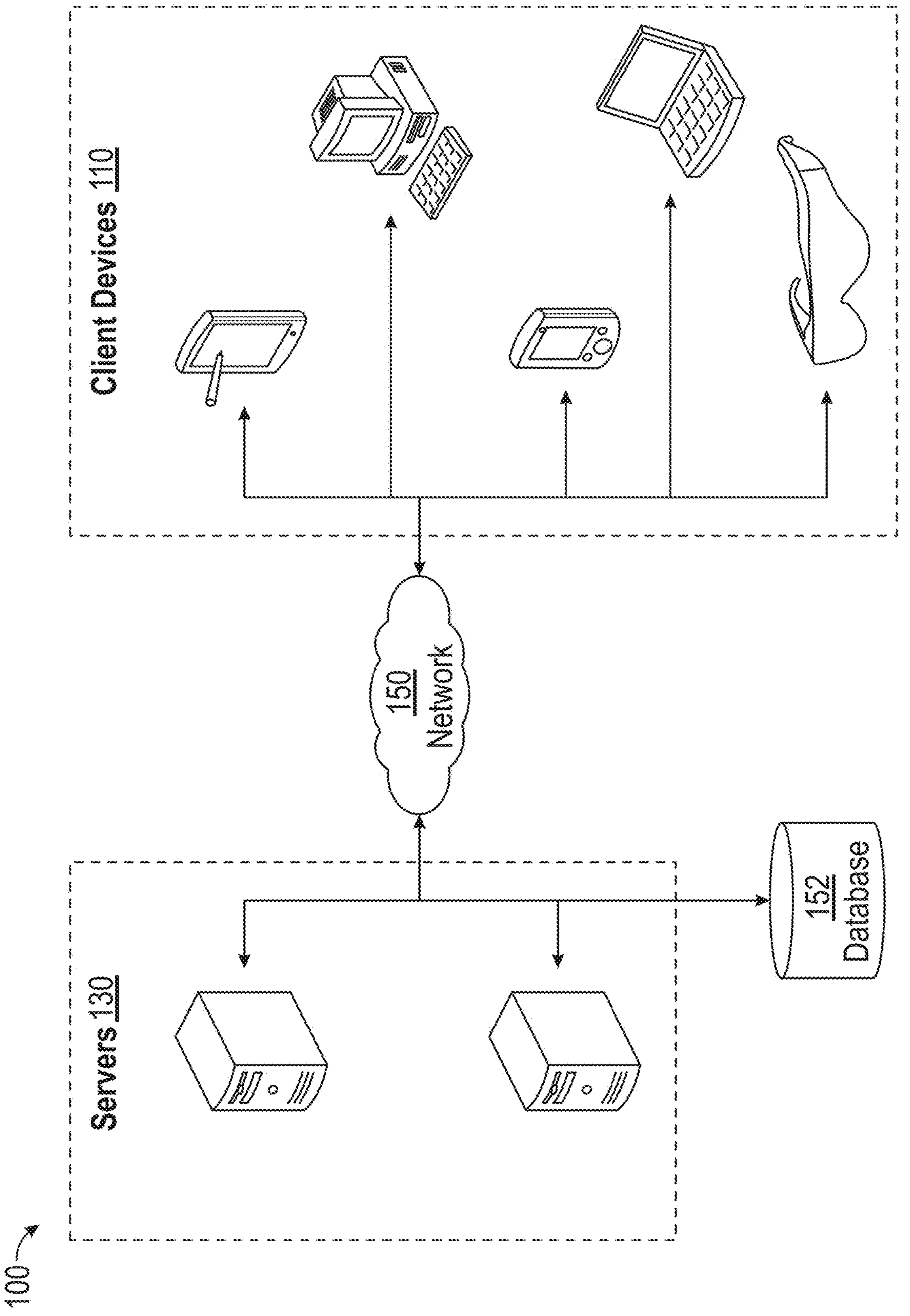
FIG. 1 is a high-level block diagram illustrating a network architecture within which some aspects of the subject technology are implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

In some aspects, the subject technology is directed to an AI camera system trained to understand framing avatars in video calls. The disclosed AI camera system uses a virtual camera that can understand among other things the user's body positioning and intent. This is drastically different from existing smart cameras that simply keep the user in frame. The disclosed virtual camera can adjust its parameters based on the user's actions, providing the best framing for the user's activity. The disclosed technology can be used in various contexts, for example, in business meetings, social interactions, fitness activities, and video games.

The system of the subject technology can work with realistic avatars, which could represent the user or even a celebrity in a virtual environment. In some implementations, the subject AI camera system can potentially be used with stylized avatars, although the focus for the present disclosure is on realistic avatars. It should be noted that realistic avatars aim to mimic the appearance and behavior of real humans as closely as possible, whereas stylized avatars are based on artistic or cartoon-like representations.

The disclosed AI camera system uses different algorithms to lock the camera to the body and adjust the lens and background based on the user's actions. The system can also adjust how far the character can move in and out of frame. The AI camera system is designed to be versatile, capable of adjusting its parameters based on the user's environment and intent. For example, if the user is in a busy environment, the camera can be brought down to reduce clutter. The system can also adjust the framing based on the user's activity, such as exercising or demonstrating a task. The subject technology has applications in various contexts, such as video games, business meetings, and social interactions.

The existing smart cameras, while having some smart capabilities, are limited in their functionality compared to the disclosed AI camera system. The disclosed AI camera system has potential applications in vast areas and can revolutionize the way users interact in virtual environments. The disclosed AI camera system is not product-specific and can be used in any virtual reality context.

Comparing the capabilities of disclosed AI cameras with traditional game engines, it is notable that the traditional game engines can only respond to user inputs and cannot take into account the user's physical movements in the real world. The AI camera system, on the other hand, uses body tracking to understand the user's actions and adjusts the camera accordingly. This provides a new degree of freedom and control for the user, allowing for a more immersive and interactive experience.

Returning now to the figures, FIG. 1 is a high-level block diagram illustrating a network architecture 100 within which some aspects of the subject technology are implemented. The network architecture 100 may include servers 130 and a database 152, communicatively coupled with multiple client devices 110 via a network 150. Client devices 110 may include, but are not limited to, laptop computers, desktop computers, and the like, and/or mobile devices such as smart phones, palm devices, video players, headsets, tablet devices, and the like.

The network 150 may include, for example, any one or more of a local area network (LAN), a wide area network (WAN), the Internet, and the like. Further, the network 150 may include, but is not limited to, any one or more of the following network topologies, including a bus network, a star network, a ring network, a mesh network, a star-bus network, tree or hierarchical network, and the like.

Figure 2:
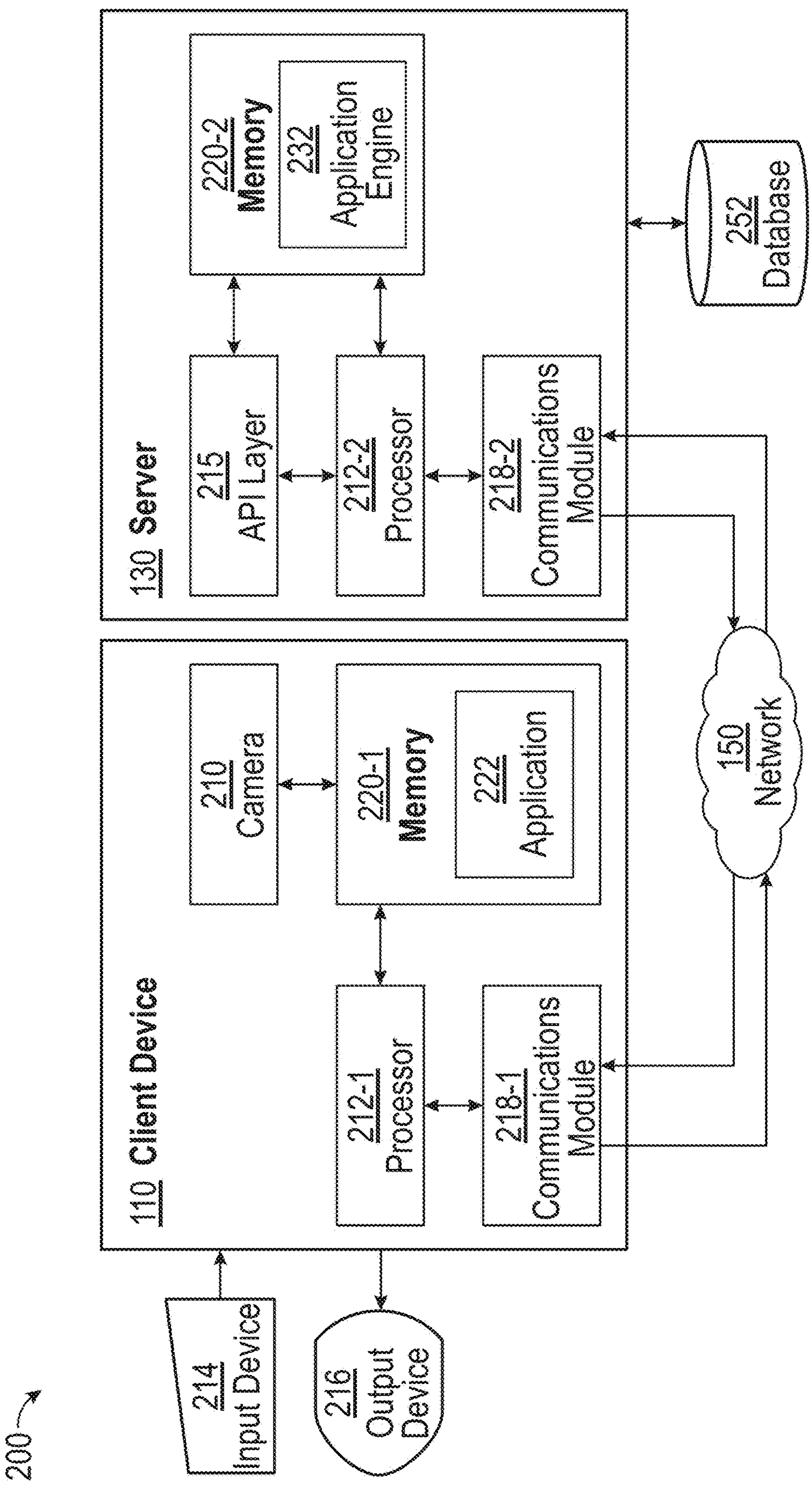
FIG. 2 is a block diagram illustrating details of a system including an AI camera of the subject technology, according to some embodiments.

FIG. 2 is a block diagram illustrating details of a system 200 including a client device and a server, as discussed herein. The system 200 includes at least one client device 110, at least one server 130 of the network architecture 100, a database 252 and the network 150. The client device 110 and the server 130 are communicatively coupled over network 150 via respective communications modules 218-1 and 218-2 (hereinafter, collectively referred to as "communications modules 218"). Communications modules 218 are configured to interface with network 150 to send and receive information, such as requests, uploads, messages, and commands to other devices on the network 150. Communications modules 218 can be, for example, modems or Ethernet cards, and may include radio hardware and software for wireless communications (e.g., via electromagnetic radiation, such as radiofrequency (RF), near field communications (NFC), Wi-Fi, and Bluetooth radio technology).

The client device 110 may be coupled with an input device 214 and with an output device 216. A user may interact with the client device 110 via the input device 214 and the output device 216. Input device 214 may include a mouse, a keyboard, a pointer, a touchscreen, a microphone, a joystick, a virtual joystick, a touchscreen display that a user may use to interact with client device 110, or the like. In some embodiments, the input device 214 may include cameras, microphones, and sensors, such as touch sensors, acoustic sensors, inertial motion units and other sensors configured to provide input data to a VR/AR headset. Output device 216 may be a screen display, a touchscreen, a speaker, and the like.

The client device 110 may also include a camera 210 (e.g., a smart camera), a processor 212-1, memory 220-1 and the communications module 218-1. The camera 210 is in communication with the processor 212-1 and the memory 220-1. The processor 212-1 is configured to execute instructions stored in a memory 220-1, and to cause the client device 110 to perform at least some operations in methods consistent with the present disclosure. The memory 220-1 may further include application 222, configured to run in the client device 110 and couple with input device 214, output device 216 and the camera 210. The application 222 may be downloaded by the user from the server 130, and/or may be hosted by the server 130. The application 222 includes specific instructions which, when executed by processor 212-1, cause operations to be performed according to methods described herein. In some embodiments, the application 222 runs on an operating system (OS) installed in client device 110. In some embodiments, application 222 may run within a web browser. In some embodiments, the processor 212-1 is configured to control a graphical user interface (GUI) for the user of one of the client devices 110 accessing the server 130.

In some embodiments, the camera 210 represents a virtual camera using an AI engine that can understand the user's body positioning and intent, which is different from existing smart cameras that simply keep the user in frame. The camera 210 can adjust the camera parameters based on the user's actions, providing the best framing for the user's activities. The camera 210 can work with highly realistic avatars, which could represent the user or a celebrity in a virtual environment by mimicking the appearance and behavior of real humans as closely as possible. In some embodiments, the camera 210 can work with stylized avatars, which can represent the user based on artistic or cartoon-like representations. In some embodiments, the camera 210 leverages body tracking to understand the user's actions and adjust the camera 210 accordingly. This provides a new degree of freedom and control for the user, allowing for a more immersive and interactive experience.

In some embodiments, the camera 210 is AI based (also referred to as an AI camera system) and can be trained to understand the way to frame a user's avatar, for example, in a video communication application such as Messenger, WhatsApp, Instagram, and the like. The camera 210 can leverage body tracking, action recognition, and/or scene understanding to adjust the virtual camera features (e.g., position, rotation, focal length, aperture) for framing the user's avatar according to the context of the video call. For example, the camera 210 can determine the right camera position for different scenarios such as when the user is whiteboarding versus writing at a desk (overhead camera) or exercising. Each of these scenarios would require a different setup that could be inferred if the AI engine of the camera 210 can understand the context.

The database 252 may store data and files associated with the server 130 from the application 222. In some embodiments, the client device 110 collects data, including but not limited to video and images, for upload to server 130 using the application 222, to store in the database 252.

The server 130 includes a memory 220-2, a processor 212-2, an application program interface (API) layer 215 and communications module 218-2. Hereinafter, the processors 212-1 and 212-2, and memories 220-1 and 220-2, will be collectively referred to, respectively, as "processors 212" and "memories 220." The processors 212 are configured to execute instructions stored in memories 220. In some embodiments, memory 220-2 includes an applications engine 232. The applications engine 232 may be configured to perform operations and methods according to aspects of embodiments. The applications engine 232 may share or provide features and resources with the client device, including multiple tools associated with data, image, video collection, capture, or applications that use data, images, or video retrieved with the application engine 232 (e.g., the application 222). The user may access the applications engine 232 through the application 222, installed in a memory 220-1 of client device 110. Accordingly, the application 222 may be installed by server 130 and perform scripts and other routines provided by server 130 through any one of multiple tools. Execution of the application 222 may be controlled by processor 212-1.

Figure 3:
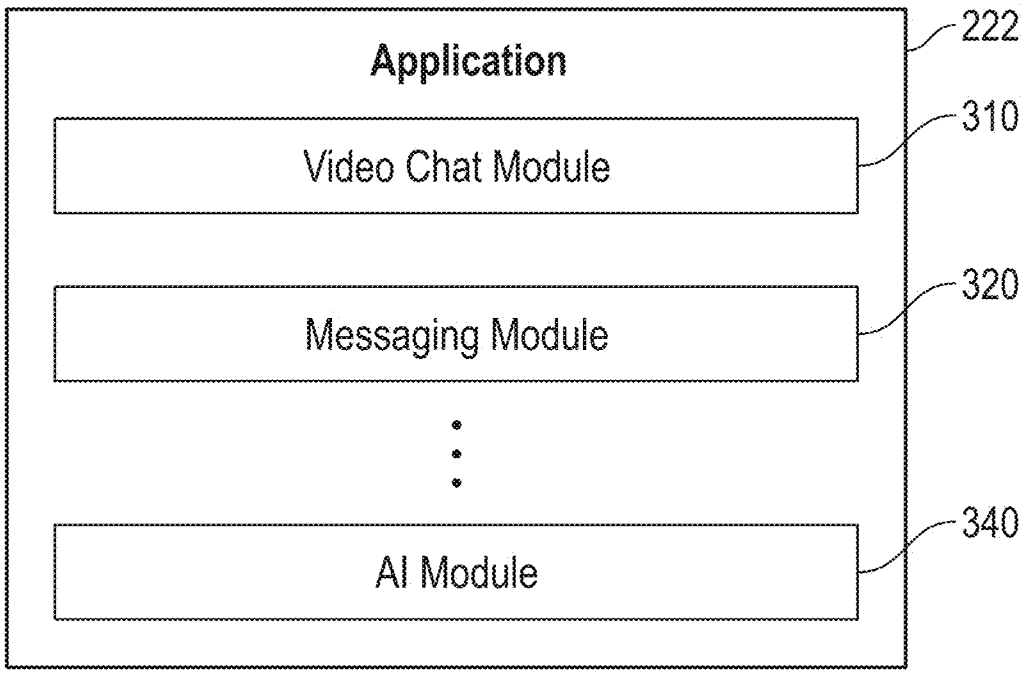
FIG. 3 is a block diagram illustrating examples of application modules used in the client device of FIG. 2, according to some embodiments.

FIG. 3 is a block diagram illustrating examples of application 222 used by the client device of FIG. 2, according to some embodiments. The application 222 includes several application modules including, but not limited to, a video chat module 310, a messaging module 320 and an AI module 340. The video chat module 310 is responsible for operations of video chat applications such as Facebook Messenger, Zoom Meeting, Facetime, Skype, and the like and can control speakers, microphones, video recorders, audio recorders and similar devices. The messaging module 320 is responsible for operations of messaging applications such as WhatsApp, Facebook Messenger, Signal, Telegram and the like and can control devices such as cameras and microphones and similar devices.

The AI module 340 may include a number of AI models. AI models apply different algorithms to relevant data inputs to achieve the tasks, or an output for which the model has been programmed for. An AI model can be defined by its ability to autonomously make decisions or predictions, rather than simulate human intelligence. Different types of AI models are better suited for specific tasks, or domains, for which their decision-making logic is most useful or relevant. Complex systems often employ multiple models simultaneously, using ensemble learning techniques like bagging, boosting or stacking.

AI models can automate decision-making, but only models capable of machine learning (ML) are able to autonomously optimize their performance over time. While all ML models are AI, not all AI involves ML. The most elementary AI models are a series of if-then-else statements, with rules programmed explicitly by a data scientist. Machine learning models use statistical AI rather than symbolic AI. Whereas rule-based AI models must be explicitly programmed, ML models are trained by applying their mathematical frameworks to a sample dataset whose data points serve as the basis for the model's future real-world predictions.

The subject technology can use an AI camera system consisting of one or more ML models trained over time using a large database (e.g., database 252 of FIG. 2). In some implementations, the AI system may include a tracking module (body-tracking module, as a part of the AI module 340) that can be trained to track body motions and understand mood and background and be able to frame avatars for the use in video calls. In some implementations, the AI camera system uses the tracking module to track among other things the user's body positioning and intent. The parameters of the disclosed virtual camera can be adjusted based on the user's actions, providing the best framing for the user's activity. The disclosed technology can be used in various contexts, for example, in business meetings, social interactions, fitness activities, and video games.

In some implementations, the AI system of the subject technology can work with realistic avatars, which could represent the user or even a celebrity in a virtual environment. In some implementations, the subject AI camera system can potentially be used with stylized avatars, although the focus for the present disclosure is on realistic avatars.

In some implementations, the disclosed AI camera system uses different algorithms to lock the camera to the body and adjust the lens and background based on the user's actions. The AI camera system can also adjust how far the character can move in and out of frame. The AI camera system is designed to be versatile, capable of adjusting its parameters based on the user's environment and intent. For example, if the user is in a busy environment, the camera can be brought down to reduce clutter. The system can also adjust the framing based on the user's activity, such as exercising or demonstrating a task.

The AI camera can understand the intent of the user via action recognition through predicting and classifying images/videos. One would just need to define the camera positions depending on action. For broad gestures and fitness exercises, full body wide angle lens are used that can pull back to see the action. For presentations that are better suited with a closeup to see facial emotions, a virtual telephoto lens is used for a closeup. Many systems in game engines have camera heuristic and design based on action. The actions can trigger camera events accordingly.

Figure 4:
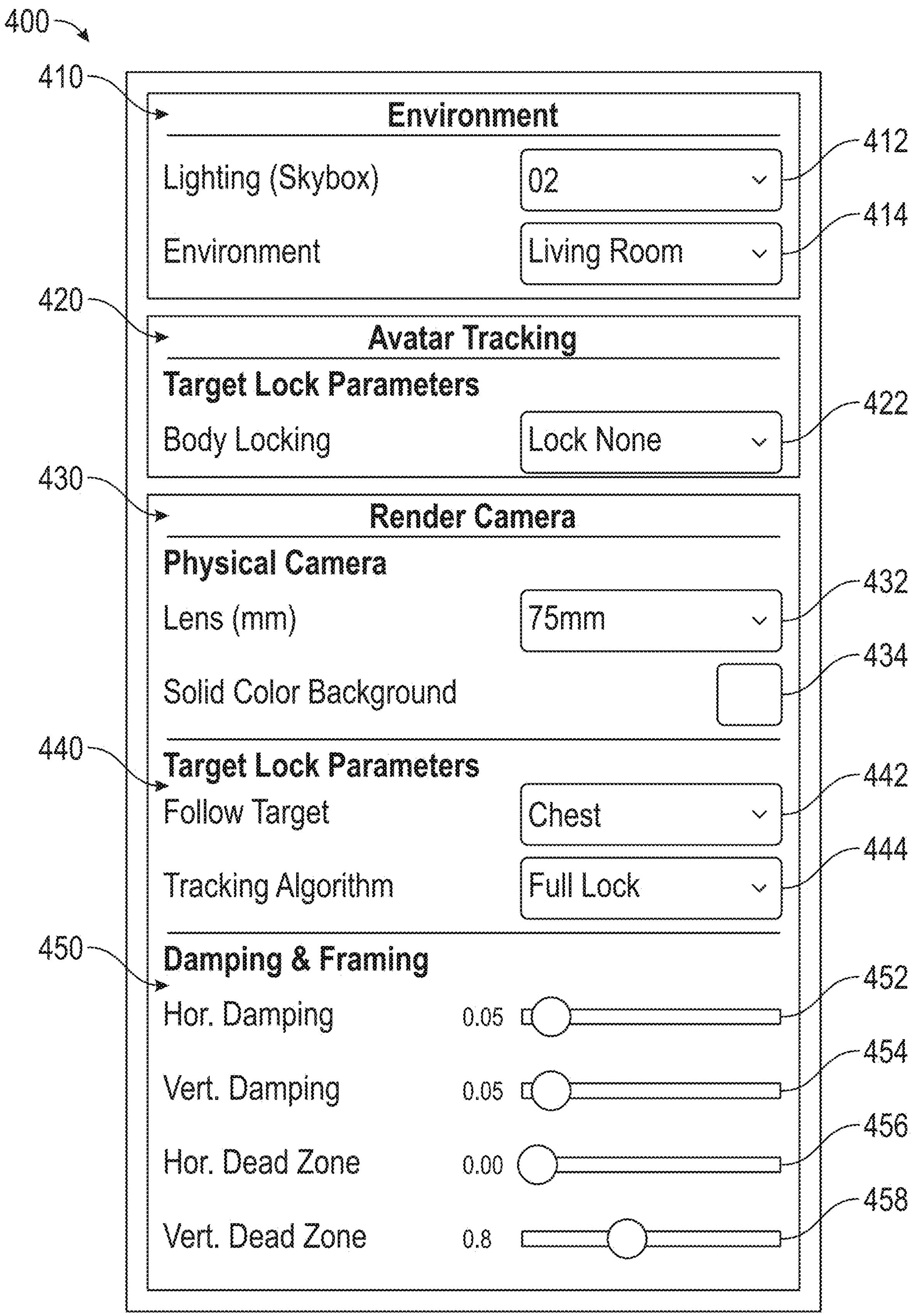
FIG. 4 is a screen shot illustrating an example of a list of settings for adjusting parameters of the AI camera system, according to some embodiments.

FIG. 4 is a screen shot illustrating an example of a list of settings 400 for adjusting parameters of the AI camera system, according to some embodiments. The list of settings 400 includes environment setting 410, avatar tracking setting 420, render camera setting 430, target lock setting 440 and damping and framing setting 450. The environment setting 410 allows adjusting a lighting parameter 412 (e.g., by selecting a lighting level) and an environment parameter 414 (e.g., living room, work room, fitness room, and the like). The avatar tracking setting 420 includes body locking parameter 422, where a locked portion of the avatar (e.g., lock shoulders, lock lower body, or lock none) to the camera is selected.

The render camera setting 430 includes lens parameter 432 (e.g., a focal length of the lens) and a solid color background parameter 434, which allows selection of a background. The target lock setting 440 includes a follow target parameter 442 (e.g., chest, shoulder, and the like) and a tracking algorithm parameter 444 (e.g., full lock). The damping and framing setting 450 allows adjusting horizontal damping parameter 452, vertical damping parameter 454, horizontal dead-zone parameter 456 and vertical dead-zone parameter 458.

Camera settings would be predefined according to the action, as described above as well. There could be camera behaviors that are manually set by the user, similar to drone camera settings such as follow, or stationary with composition settings. Drone cameras can be used to capture a variety of shots, including panning (horizontal movement of the camera that can establish a sense of location), 360-degree rotation (a full rotation around a subject or location that can show off a view from a specific vantage point), orbit shot (a shot where the drone slowly moves toward a subject, then flies past while the camera remains fixed on the subject), aerial shots (a popular type of shot that can emphasize abstract forms and patterns), extreme close-ups (a popular type of shot that can emphasize abstract forms and patterns) and bird's-eye views (a popular type of shot that can emphasize abstract forms and patterns).

Figure 5:
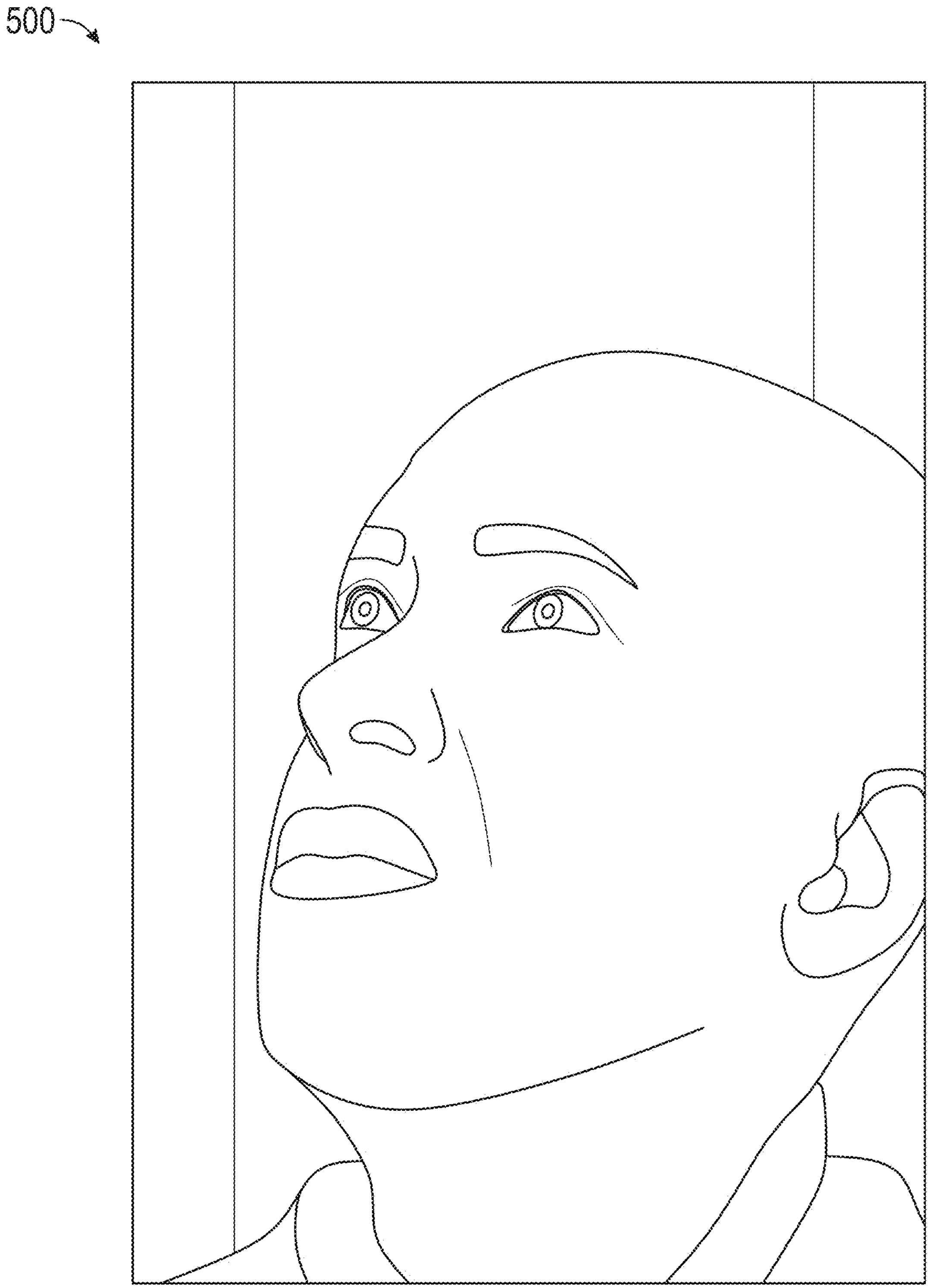
FIG. 5 is a screen shot illustrating an example of an avatar of a user framed by the AI camera with selected settings, according to some embodiments.

FIG. 5 is a screen shot illustrating an example of an avatar 500 of a user framed by the AI camera with selected settings, according to some embodiments. The avatar 500 of FIG. 5 is captured by the disclosed AI camera system (210 of FIG. 2) with the lighting parameter (412 of FIG. 4) adjusted to 01 setting and the environment (410 of FIG. 4) set to work-rooms. Also, for the body lock parameter (422 of FIG. 4), the lock shoulders selection is made. Further, the follow target parameter (442 of FIG. 4) is set to the viewpoint option. Other settings and parameters are set as shown in FIG. 4. The avatar 500 may be suitable for a video call to showcase, for example, a thinking or surprised mood.

Figure 6:
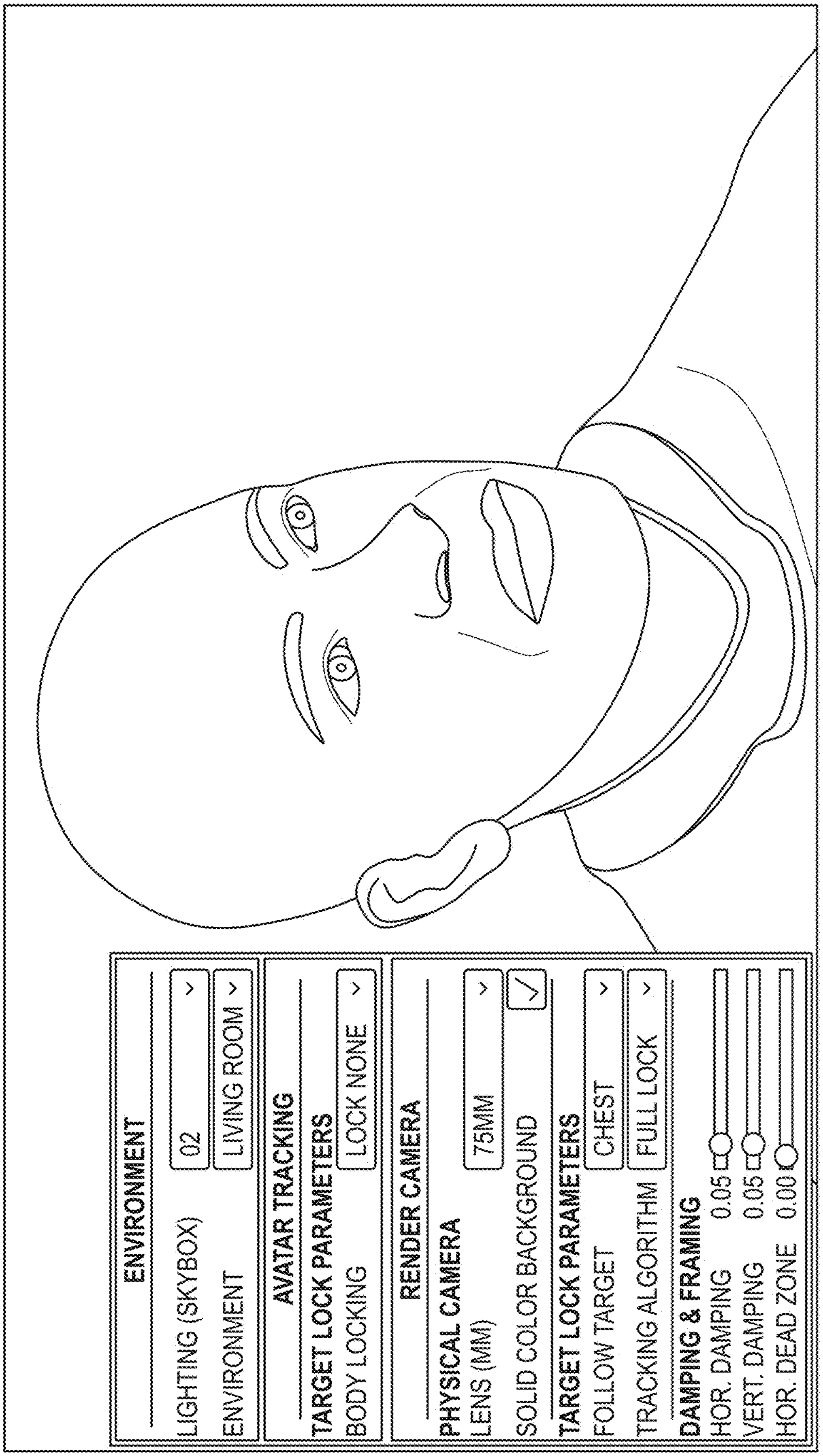
FIG. 6 is a screen shot illustrating another example of an avatar of a user framed by the AI camera with selected settings, according to some embodiments.

FIG. 6 is a screen shot illustrating another example of an avatar 600 of a user framed by the AI camera with selected settings, according to some embodiments. The avatar 600 of FIG. 6 is captured by the disclosed AI camera system (210 of FIG. 2) with the lighting parameter (412 of FIG. 4) adjusted to 02 setting and the environment (410 of FIG. 4) set to living room. However, for the body locking parameter (422 of FIG. 4), no selection is made. Further, the follow target parameter (442 of FIG. 4) is set to the chest option. Other settings and parameters are set as shown in FIG. 4; however, the mood and background are different from the avatar 500. The avatar 600 may also be suitable for a video call to show case a different mood.

Figure 7:
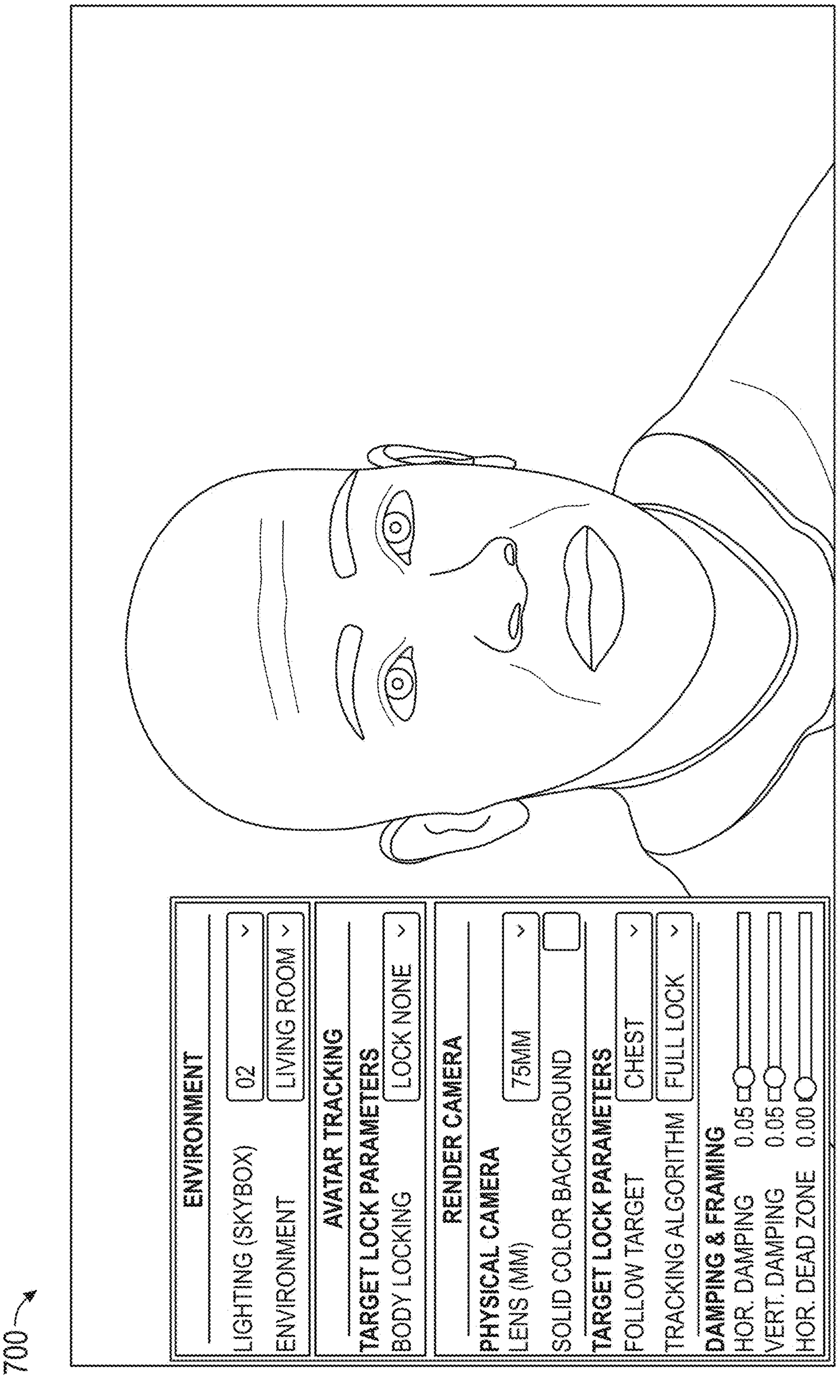
FIG. 7 is a screen shot illustrating yet another example of an avatar of a user framed by the AI camera with selected settings, according to some embodiments.

FIG. 7 is a screen shot illustrating yet another example of an avatar 700 of a user framed by the AI camera with selected settings, according to some embodiments. The avatar 700 of FIG. 7, which shows yet a different pose, is captured by the disclosed AI camera system (210 of FIG. 2) with the lighting parameter (412 of FIG. 4) adjusted to 02 setting and the environment (410 of FIG. 4) set to living room. However, for the body locking parameter (422 of FIG. 4), no selection is made. Further, the follow target parameter (442 of FIG. 4) is set to the chest option. Other settings and parameters are set as shown in FIG. 4. As seen from FIG. 7, the mood and background are different from the avatars 500 and 600.

Figure 8:
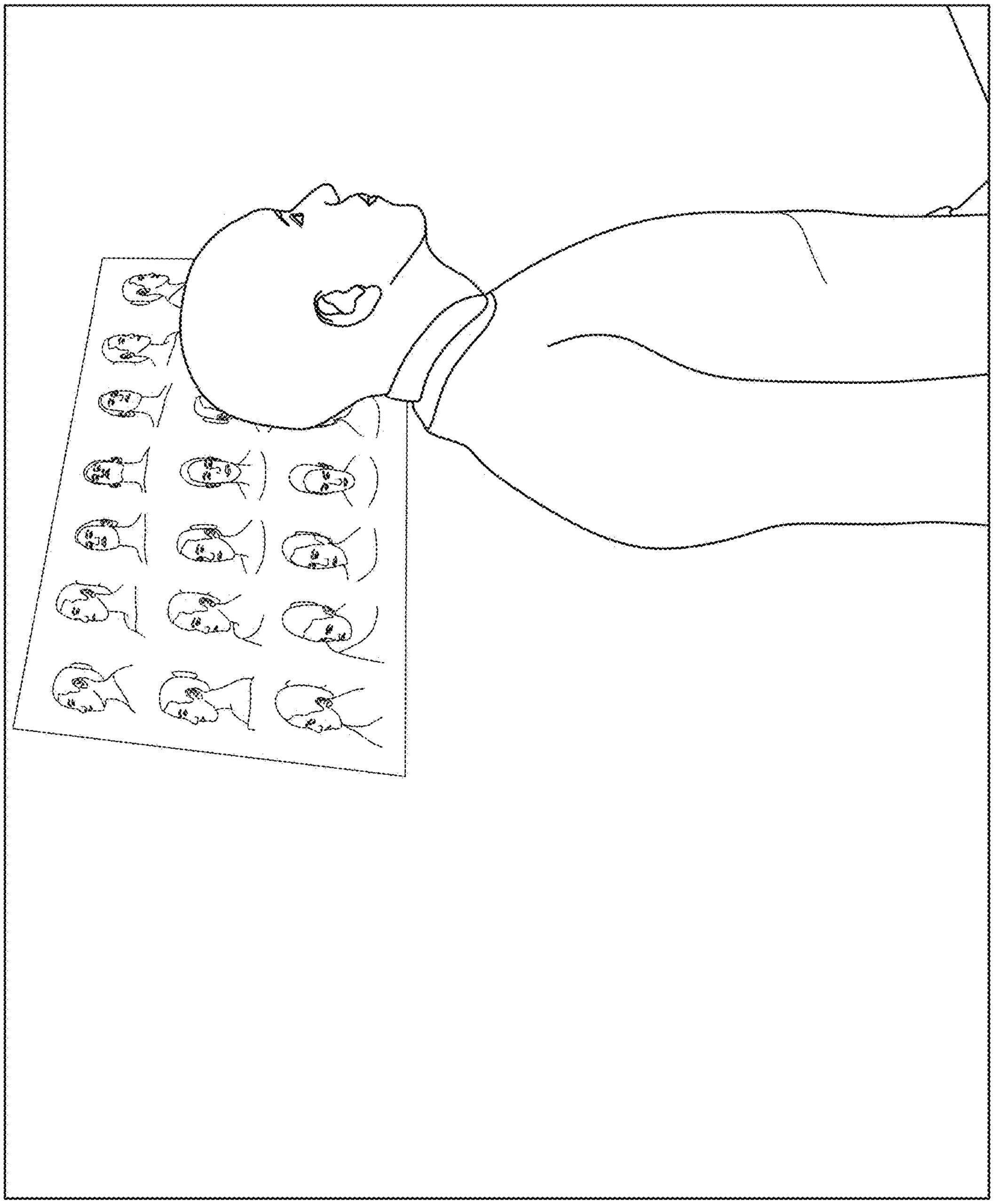
FIG. 8 is a screen shot illustrating yet another example of an avatar of a user framed by the AI camera with selected settings, according to some embodiments.

FIG. 8 is a screen shot illustrating yet another example of an avatar 800 of a user framed by the AI camera with selected settings, according to some embodiments. The avatar 800 of FIG. 8, which shows yet a different pose, is captured by the disclosed AI camera system (210 of FIG. 2) with the lighting parameter (412 of FIG. 4) adjusted to 02 setting and the environment (410 of FIG. 4) set to living room. However, for the body locking parameter (422 of FIG. 4), a different selection is made, and the tracking algorithm parameter (444 of FIG. 4) is set to the framing option. Other settings and parameters are set as shown in FIG. 4. The avatar 800 may be suitable for a video call to showcase, for example, a walking avatar walking in a corridor or a living room.

Figure 9:
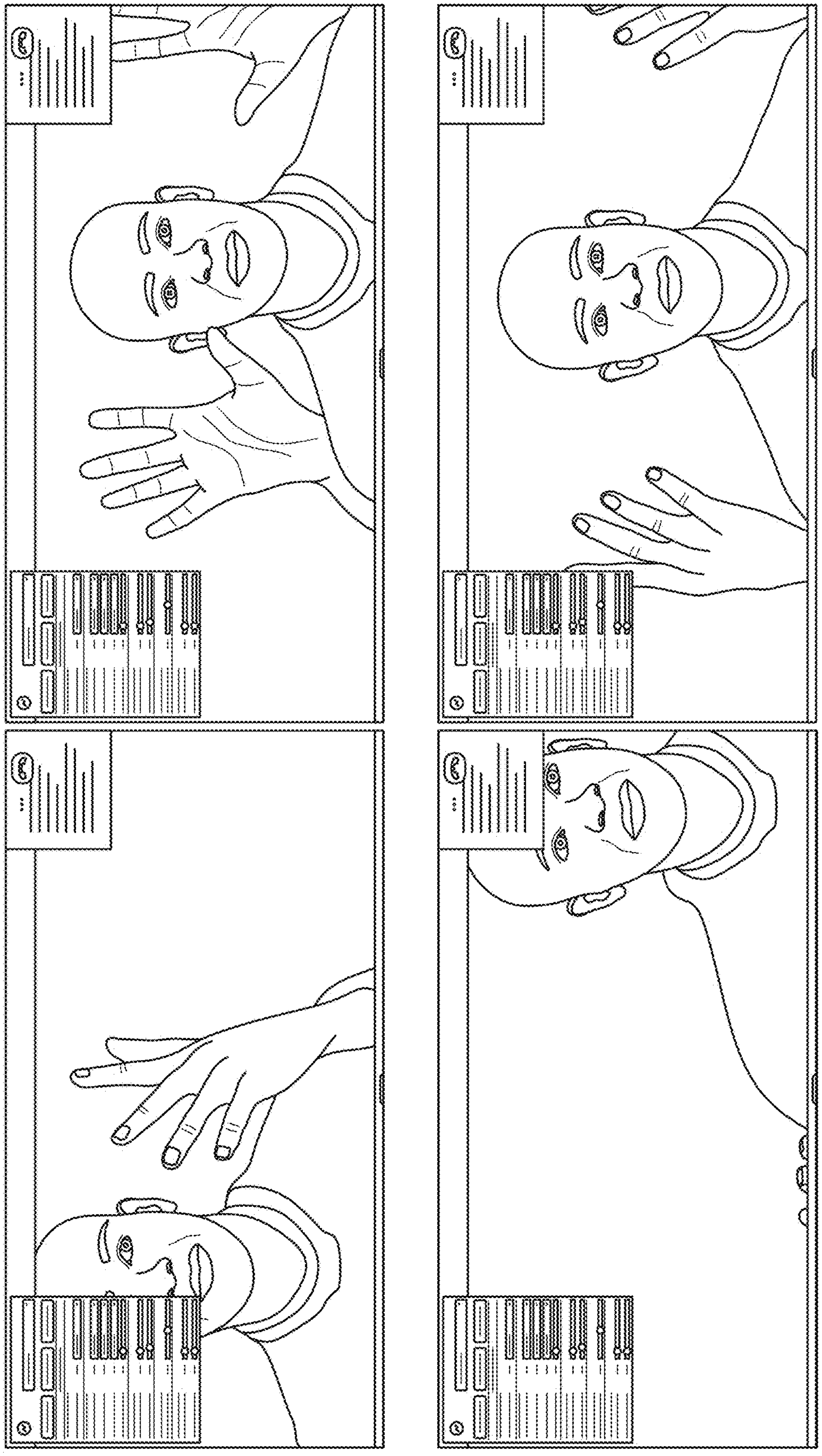
FIG. 9 shows screen shots illustrating yet other examples of an avatar of a user framed by the AI camera with selected settings, according to some embodiments.

FIG. 9 shows screen shots illustrating yet other examples of an avatar of a user framed by the AI camera with selected settings, according to some embodiments. The avatars 900 of FIG. 9, which show fitness poses, are captured by the disclosed AI camera system (210 of FIG. 2) with the lighting parameter (412 of FIG. 4) adjusted to 02 setting and the environment (410 of FIG. 4) set to living room. However, for the body locking parameter (422 of FIG. 4), a different selection is made, and the tracking algorithm parameter (444 of FIG. 4) is set to the framing option. Other settings and parameters are set as shown in FIG. 4. The avatars 900 may be suitable for a video call to showcase, for example, an exercising avatar. The avatars 900 indicate that as the avatar moves out of frame, the camera reframes accordingly to center the avatar.

Figure 10:
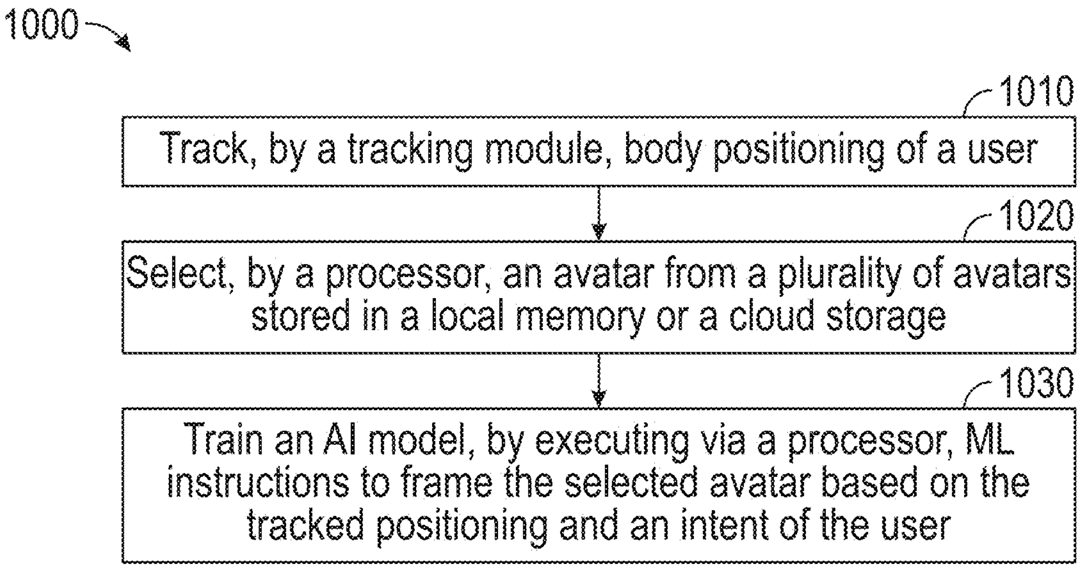
FIG. 10 is a flow diagram illustrating an example method of training an AI camera system, according to some embodiments.

FIG. 10 is a flow diagram illustrating an example method 1000 for training an AI camera system, according to some embodiments. For the sake of explanation, the method 1000 is shown with reference to components of system 200, including application 222 executing on client device 110, as described above with reference to FIG. 2. The method 1000 includes tracking, by a tracking module (e.g., included in AI module 340 of FIG. 3), body positioning of a user (1010). The method also includes selecting, by a processor (e.g., 212 of FIG. 2), an avatar from a plurality of avatars stored in a local memory (e.g., 220 of FIG. 2) or a cloud storage (e.g., database 252 of FIG. 2) (1020). The method further includes training an AI model (e.g., 340 of FIG. 3), by executing via a processor, ML instructions to frame the selected avatar based on the tracked positioning and an intent of the user (1030).

An aspect of the subject technology is directed to a virtual device that includes a processor to execute machine-learning (ML) instructions, memory to store a first set of data and a tracking module to track body positioning of a user. The ML instructions are used to train an artificial-intelligence (AI) model to frame an avatar by leveraging the tracked body positioning of the user.

In some implementations, the virtual device further comprises a communications module to access a cloud storage including a second set of data, and the first set of data and the second set of data comprise a plurality of avatars.

In one or more implementations, the framed avatar comprises a selected one of the plurality of avatars.

In some implementations, the AI model is further trained to enable understanding the user's intent and a surrounding environment of the user.

In one or more implementations, the AI model is trained to frame the avatar with different lighting settings.

In some implementations, the AI model is trained to frame the avatar with locking to different portions of a body of the user.

In one or more implementations, the AI model is trained to frame the framed avatar using different algorithms.

In some implementations, the AI model is trained to frame the avatar with different parameters of a physical camera setting, and the different parameters include a lens focal length and a solid color background parameter.

In one or more implementations, the AI model is trained to frame the avatar using a plurality of damping and framing paraments.

In some implementations, the AI model is trained to adjust to allow the avatar to move in and out of a frame.

In one or more implementations, the AI model is trained to adjust framing based on an activity of the user, wherein the activity of the user includes exercising or demonstrating a task.

In some implementations, the AI model is trained to adjust framing based on an application including a video game, a business meeting and a social interaction application.

Another aspect of the subject technology is directed to a virtual camera that includes a processor to execute ML instructions and a tracking module to track body positioning of a user. The ML instructions are used to train an AI model to frame an avatar based on the tracked body positioning of the user. The avatar includes a selected one of a plurality of avatars. The plurality of avatars are retrieved from a local memory or obtained from a cloud storage.

In some implementations, the AI model is further trained to enable understanding the user's intent and a surrounding environment of the user and to frame the avatar with different lighting settings.

In one or more implementations, the AI model is trained to adjust framing based on an activity of the user, and the activity of the user includes exercising or demonstrating a task.

In some implementations, the AI model is trained to adjust framing based on an application including a video game, a business meeting and a social interaction application.

In one or more implementations, the AI model is trained to frame the avatar with different algorithms and different parameters of a physical camera setting, and the different parameters include a lens focal length and a solid color background parameter.

Yet another aspect of the subject technology is directed to a method that includes tracking, by a tracking module, body positioning of a user. The method also includes selecting, by a processor, an avatar from a plurality of avatars stored in a local memory or a cloud storage. The method further includes training an AI model, by executing via a processor, ML instructions to frame the selected avatar based on the tracked positioning and an intent of the user.

In some implementations, training the AI model further includes enabling understanding a surrounding environment of the user and enabling framing the avatar with different lighting settings.

In one or more implementations, training the AI model further includes enabling framing the avatar with locking to different portions of a body of the user, framing the avatar with algorithms and different parameters of a physical camera setting, the different parameters including a lens focal length and a solid color background parameter, adjusting framing based on an activity of the user, wherein the activity of the user includes exercising or demonstrating a task, and adjusting framing based on an application including a video game, a business meeting and a social interaction application.

In some implementations, the word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially described as such, one or more features from a described combination can in some cases be excised from the combination, and the described combination may be directed to a sub-combination or variation of a sub-combination.

The subject matter of this specification has been described in terms of particular aspects, but other aspects can be implemented and are within the scope of the following clauses. For example, while operations are depicted in the drawings in a particular order, this should not be understood as requiring that such operations be performed in the particular order shown or in sequential order, or that all illustrated operations be performed, to achieve desirable results. The actions recited in the clauses can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the clauses. In addition, in the detailed description, it can be seen that the description provides illustrative examples, and the various features are grouped together in various implementations for the purpose of streamlining the disclosure. The method of disclosure is not to be interpreted as reflecting an intention that the described subject matter requires more features than are expressly recited in each clause. Rather, as the clauses reflect, inventive subject matter lies in less than all features of a single disclosed configuration or operation. The clauses are hereby incorporated into the detailed description, with each clause standing on its own as a separately described subject matter.

Aspects of the subject matter described in this disclosure can be implemented to realize one or more of the following potential advantages. The described techniques may be implemented to support a range of benefits and significant advantages of the disclosed eye tracking system. It should be noted that the subject technology enables fabrication of a depth-sensing apparatus that is a fully solid-state device with small size, low power, and low cost.

As used herein, the phrase "at least one of" preceding a series of items, with the terms "and" or "or" to separate any of the items, modifies the list as a whole, rather than each member of the list (i.e., each item).

To the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A virtual device comprising:

a processor configured to execute machine-learning (ML) instructions;

memory configured to store a first set of data; and a tracking module configured to track body positioning of a user, wherein the ML instructions are configured to train an artificial-intelligence (AI) model to frame an avatar by leveraging the tracked body positioning of the user, wherein the AI model is further trained to determine an intent of the user via action recognition and to adjust one or more parameters of a virtual camera setting, including a lens focal length and a solid color background parameter, to frame the avatar based on the intent of the user.

2. The virtual device of claim 1, further comprising a communications module configured to access a cloud storage including a second set of data, wherein the first set of data and the second set of data comprise a plurality of avatars.

3. The virtual device of claim 2, wherein the framed avatar comprises a selected one of the plurality of avatars.

4. The virtual device of claim 1, wherein the AI model is further trained to enable understanding the user's intent and a surrounding environment of the user.

5. The virtual device of claim 1, wherein the AI model is trained to frame the avatar with different lighting settings.

6. The virtual device of claim 1, wherein the AI model is trained to frame the avatar with locking to different portions of a body of the user.

7. The virtual device of claim 1, wherein the AI model is trained to frame the framed avatar using different algorithms.

8. The virtual device of claim 1, wherein the AI model is trained to frame the avatar with different parameters of a physical camera setting, wherein the different parameters include a lens focal length and a solid color background parameter.

9. The virtual device of claim 1, wherein the AI model is trained to frame the avatar using a plurality of damping and framing paraments.

10. The virtual device of claim 1, wherein the AI model is trained to adjust to allow the avatar to move in and out of a frame.

11. The virtual device of claim 1, wherein the AI model is trained to adjust framing based on an activity of the user, wherein the activity of the user includes exercising or demonstrating a task.

12. The virtual device of claim 1, wherein the AI model is trained to adjust framing based on an application including a video game, a business meeting and a social interaction application.

13. A virtual camera comprising:

a processor configured to execute ML instructions; and a tracking module configured to track body positioning of a user, wherein:

the ML instructions are configured to train an AI model to frame an avatar based on the tracked body positioning of the user;

the avatar includes a selected one of a plurality of avatars; and the plurality of avatars are retrieved from a local memory or obtained from cloud storage;

wherein the AI model is further trained to determine an intent of the user via action recognition and to adjust one or more parameters of a virtual camera setting, including a lens focal length and a solid color background parameter, to frame the avatar based on the determined intent of the user.

14. The virtual camera of claim 13, wherein the AI model is further trained to enable understanding the user's intent and a surrounding environment of the user and to frame the avatar with different lighting settings.

15. The virtual camera of claim 13, wherein the AI model is trained to adjust framing based on an activity of the user, wherein the activity of the user includes exercising or demonstrating a task.

16. The virtual camera of claim 13, wherein the AI model is trained to adjust framing based on an application including a video game, a business meeting and a social interaction application.

17. The virtual camera of claim 13, wherein the AI model is trained to frame the avatar with different algorithms and different parameters of a physical camera setting, wherein the different parameters include a lens focal length and a solid color background parameter.

18. A method, comprising:

tracking, by a tracking module, body positioning of a user;

selecting, by a processor, an avatar from a plurality of avatars stored in a local memory or a cloud storage; and training an AI model, by executing via a processor, ML instructions to frame the selected avatar based on the tracked positioning and an intent of the user, wherein the intent of the user is determined via action recognition and the AI model is further trained to adjust one or more parameters of a virtual camera setting, including a lens focal length and a solid color background parameter, to frame the avatar based on the intent of the user.

19. The method of claim 18, wherein training the AI model further includes enabling understanding a surrounding environment of the user and enabling framing the avatar with different lighting settings.

20. The method of claim 18, wherein training the AI model further includes enabling:

framing the avatar with locking to different portions of a body of the user;

framing the avatar with algorithms and different parameters of a physical camera setting, the different parameters including a lens focal length and a solid color background parameter;

adjusting framing based on an activity of the user, wherein the activity of the user includes exercising or demonstrating a task; and adjusting framing based on an application including a video game, a business meeting and a social interaction application.

* * * * *